Aug. 24, 1926.  1,597,008
F. W. BIRTCH
HOT WATER HEATER
Filed June 24, 1922  2 Sheets-Sheet 1
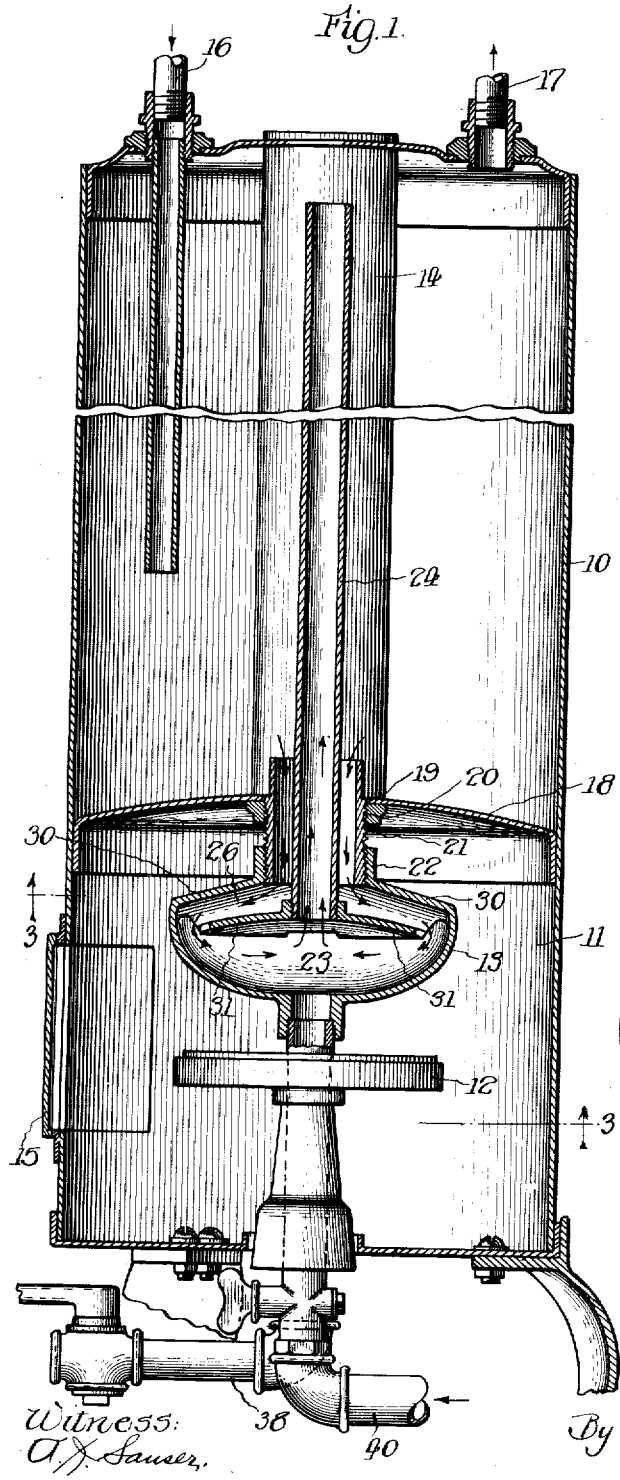
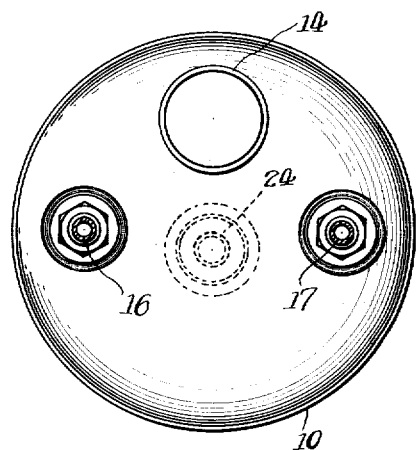
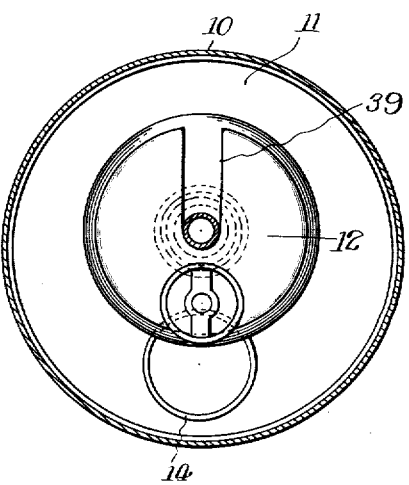
Inventor:
Fred W. Birtch,
By Harvey L. Hanson
Atty.
Witness:
A. X. Sauser Aug. 24, 1926.   F. W. BIRTCH   1,597,008
HOT WATER HEATER
Filed June 24, 1922   2 Sheets-Sheet 2
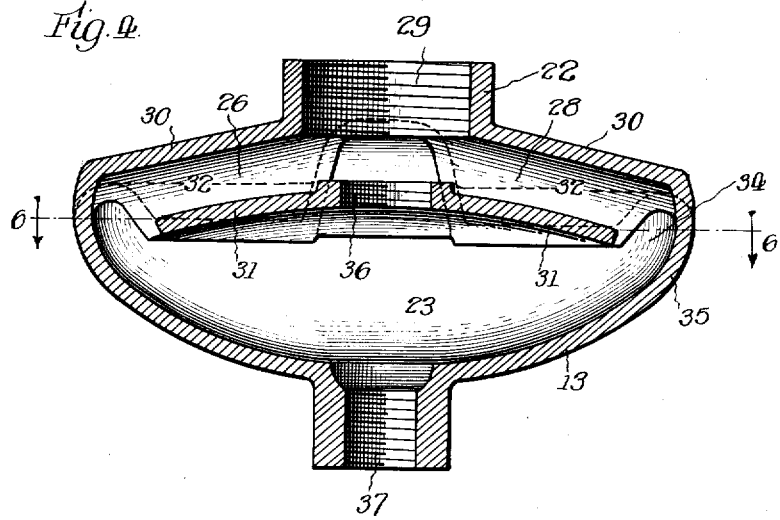
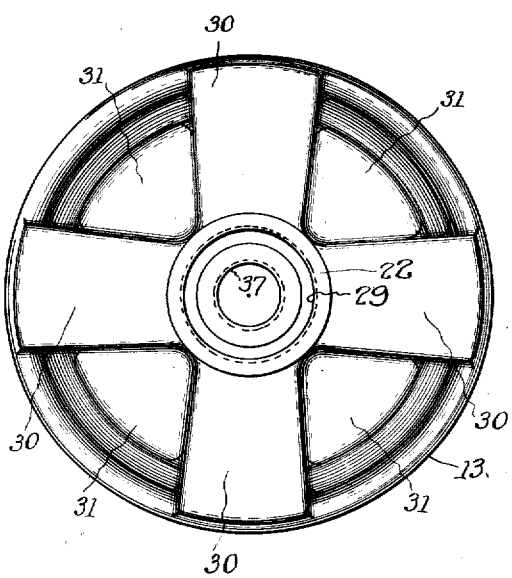
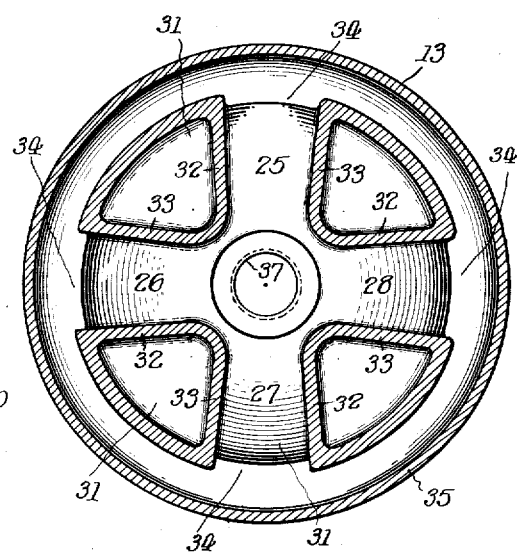
Witness:
A. J. Sauser
Inventor:
Fred W. Birtch,
By Harvey L. Hanson
Atty.

Patented Aug. 24, 1926.

1,597,008

UNITED STATES PATENT OFFICE.

FRED W. BIRTCH, OF LA PORTE, INDIANA, ASSIGNOR TO BASTIAN-MORLEY CO., OF LA PORTE, INDIANA, A CORPORATION OF INDIANA.

HOT-WATER HEATER.

Application filed June 24, 1922. Serial No. 570,738.

The invention relates to water heaters for heating and supplying water in homes and other places where hot water is required.

The invention is used in connection with a combined hot water boiler and heater in which the tank or boiler is arranged above the combustion chamber of the heater.

The invention relates particularly to a water spreader which is connected in a manner to permit water to flow therethrough during its circulation. The water in the spreader is subjected to heat from the burner, and the water is retained in the spreader until it is heated sufficiently to cause it to flow therefrom to the upper portion of the boiler, from which it may be drawn for use, as desired.

It is an object of the invention to produce a spreader which is provided with a plurality of tubular internal passageways and a main water heating chamber, and which will subject only a relatively small portion of the entire body of water to be heated to the heat of the flame of the burner, which thus reduces the period of time necessary for heating a given amount of water.

It is an additional object of the invention to arrange the inlet to and the outlet from the spreader so that both will communicate with the interior of the tank through a single aperture.

It is a further object to arrange the inlet to and the outlet from the spreader so that the incoming, descending, relatively cold water and the outgoing, ascending hot water, which is discharged from the spreader, will be kept separated until the hot water is discharged into the upper portion of the boiler.

It is an object of the invention to form the spreader with a convex bottom so that it will present to the direct action of the flame from the burner a large curved heating surface and area in order to facilitate the rapid heating of the water.

It is a further object of the invention to provide a spreader of circular outline which permits the water to circulate freely therethrough, retardation of circulation being prevented because of the elimination of surfaces which might obstruct and hinder the flow of the water during circulation.

It is an additional object of the invention to arrange the plurality of tubular passages for the incoming relatively cold water so that they will discharge the incoming cold water at various, or relatively different, portions of the water heating chamber in the spreader, which causes the incoming cold water to be quickly and efficiently distributed as it enters the heating chamber of the spreader. The distribution of the incoming cold water causes the period of time necessary for heating a given quantity of water to be reduced.

It is also an object of the invention to provide the spreader with a drain whereby the spreader may be drained and the water tank may be drained through the spreader.

It is an object of the invention to provide a particular form of water heating chamber, to provide water inlets arranged in a certain relative relation to the tubular water heating chamber and to provide a certain relative position and relationship of the water inlets to and the water outlet from the heating chamber of the spreader.

In addition, it is an object to provide a flue for the escape of the gases from within the heating chamber in which the burner and the spreader are arranged, and to offset this flue so that the burner may be arranged centrally within said heating chamber. The result of this arrangement is that the action of the heat emanating from the burner is equally distributed over the entire surface of the bottom of the water tank, and the escaping gases contained within the flue contribute their heat to the water contained in the tank.

It is an object of the invention to provide a water heater which will effectively, economically and rapidly heat the water; which will assist in causing the constant circulation of the water; which will eliminate the necessity for the use of a heating coil; which will reduce the clogging due to the accumulation of lime, sediment and other matter, to a minimum; and which will also reduce the cost and expense of manufacture, installation and operation of the water heater.

The structure of the invention includes a water spreader which is cast integrally to provide a water heating chamber and a plurality of tubular water inlets or passageways to said chamber, said tubular inlets or passageways being inclined downwardly and disposed relatively to each other so as to distribute the incoming relatively cold water at different points of the chamber. The bottom surface of the heating chamber, or the surface which is exposed to the flame emanating from the burner, is convex, or curved to produce a dished interior. This construction increases the heating surface and permits a substantial quantity of water to be subjected to the immediate action of the heat from the burner.

The water passages leading to the heating chamber are separated from the heating chamber by a wall which is also convex, but is dished in the opposite direction from the bottom surface of the heating chamber. The convex wall forms the top wall of the heating chamber and the top wall of the water spreader between the tubular passageways. It forms the bottom wall of the tubular passageways. This wall is provided with an aperture with which a pipe connection is made. The pipe connection is provided to allow the heated water to pass from the heating chamber, ascend in the pipe and be discharged from the opposite end thereof at its termination adjacent the top of the water tank. All of the tubular cold water passages which feed water to the heating chamber of the water spreader are fed by a single pipe connection which communicates with the interior of the water tank. This pipe connection is arranged concentrically with the hot water discharge pipe. The water inlets and outlets of the spreader are both arranged in the upper portion thereof, which materially reduces the work necessary in assembling the spreader and the water tank.

The spreader is provided with a drain opening at the under side of the heating chamber, whereby both the spreader and the water tank may be drained.

The invention will be explained and more readily understood when read in conjunction with the accompanying drawings in which one embodiment thereof is illustrated, it being obvious that changes and modifications may be made without departing from the spirit of the appended claims forming a part hereof.

In the drawings,

Fig. 1 is a vertical longitudinal section of a hot water tank having the water spreader embodying the invention associated therewith, and illustrating a burner cooperatively arranged with respect thereto;

Fig. 2 is a top plan view of the tank shown in Fig. 1;

Fig. 3 is a bottom plan view partly in section, taken on line 3—3 of Fig. 1 and looking in the direction of the arrows;

Fig. 4 is an enlarged sectional view of the water spreader shown in Fig. 1;

Fig. 5 is a top plan view of the water spreader shown in Fig. 4; and

Fig. 6 is a sectional view of the water spreader taken on line 6—6 of Fig. 4, looking in the direction of the arrows.

In the structure illustrated in the drawings, the water spreader is shown as associated with a hot water tank or boiler 10. The lower portion of the tank 10 is constructed to provide a housing or combustion chamber 11, in which the burner 12 and the water spreader, generally designated 13, are arranged. The burner 12 may be of any suitable construction to burn gas, oil, or other fuel, as desired. The combustion chamber 11 is provided with a flue 14 through which the burnt gases may escape and be passed from the room in which the tank is placed. The flue, or passage, is offset with relation to the burner and spreader so that said burner and spreader may be arranged concentrically within the heating chamber. This arrangement permits the action of the heat emanating from the flame of the heater to be equally distributed over the area of the bottom of the tank, which adds to the efficiency of the structure, and it also permits the flue to pass through the interior of the tank, so that the gases contained in the flue contribute their heat to the water in the tank. The lower portion of the tank is also provided with a door 15, whereby access may be had to the various devices arranged within the chamber 11.

The upper portion of the tank or boiler 10 provides a means in which the water to be heated may be confined, and to which and from which the water may be supplied and discharged, respectively. For the purpose of supplying and discharging the water, the upper portion of the tank 10 is provided with a cold water inlet 16 and a hot water outlet 17. The inlet and outlet connections are of the usual construction in tanks of this character, and therefore a detailed description thereof is unnecessary.

The tank 10 is provided with a separating and dividing wall or partition 18, which separates the combustion chamber 11 from the upper portion of the tank in which water to be heated is confined. The wall 18 is apertured at 19 and is provided with a collar 20 having internal screw threads. The aperture 19 and the collar 20 are centrally arranged in the dividing wall 18 and provide a means whereby the water spreader 13 may be cooperatively associated with the tank. To permit of the association of the water spreader with the apertured portion of the partition 18, the water spreader is provided with the externally threaded nipple or pipe 21.

The nipple or pipe 21 is threaded into the aperture 19, the collar 20 and also into the internally threaded annular collar 22 of the water spreader, and provides a connection between the water spreader and the interior of the upper portion of the tank. The nipple or pipe 21 permits the water to descend from the tank into the heating chamber 23 of the water spreader 13 in which it will be heated. The action of the heat on the water in the heating chamber 23 within the spreader causes the heated water to ascend in the circulating pipe 24 and be discharged therefrom into the interior of the water tank 10.

The water spreader 13 is constructed so that the incoming relatively cold water will be distributed at relatively different points within the interior of the heating chamber 23. The distribution of the cold water is accomplished by arranging a plurality of radially disposed, downwardly inclined tubular water passages 25, 26, 27 and 28 so that their inner ends communicate with the passage 29 formed by the annular collar 22. The collar 22, as before stated, is connected by means of the threaded pipe 21 with the interior of the water containing compartment of the tank 10. The tubular passages 25, 26, 27 and 28 are formed by the oppositely disposed upper and lower walls 30 and 31 and the side walls 32 and 33.

The tubular passages 25, 26, 27 and 28 are shortened slightly by having portions of the convex wall 31 cut away at the periphery thereof to form apenings 34. The openings 34 allow the water to pass from the passage 29 through the various tubular passages 25, 26, 27 and 28 into the heating chamber 23 formed by the convex walls 31 and 35, and in which the water is confined until heated to the proper degree.

The convex wall 31 provides a wall which is common to both the bottom of all the tubular passages 25, 26, 27 and 28 and the upper outer wall of the portions of the water spreader lying between the walls 30, 32 and 33 of each of the tubular passageways 25, 26, 27 and 28. The wall 31 is provided with a threaded aperture 36 to which the circulating pipe 24 is connected.

It will be noted by referring to Fig. 1 that the nipple or pipe 21 and the circulation pipe 24 are arranged concentrically and in spaced relation to each other, which permits the relatively cold water to pass downward in said pipe 21 outside the circulation pipe 24 in its travel from the interior of the tank 10 to the heating chamber 23 of the water spreader. The compact arrangement of the nipple 21 and the pipe 24 subjects the cold water to the heat of the heated water during its passage from the interior of the water spreader 13, which assists in heating the water to the desired degree. In addition, the labor necessary when the parts are to be associated with, or disconnected from, each other is reduced materially.

The convex wall 35 of the water spreader 13 is formed of relatively thin material and presents a large surface to the burner. This enables the water to be quickly heated to a high degree of temperature by the flames from the burner 12. The wall 35 of the water spreader 13 is provided with a threaded aperture 37, to which is connected the drain pipe 38, whereby the water compartment of the tank 10 and the water spreader 13 may be drained of any water contained therein. The burner 12 is provided with a slot 39 for the reception of the vertical portion of the drain pipe 38, which permits the burner to be arranged directly beneath the water spreader 13. Gas, or other fuel, is supplied to the burner by the supply pipe 40, which has the usual fittings.

From the foregoing description it is evident that the convex walls 31 and 35 cooperate and assist in the heating action, since they cooperate to form a heating chamber in which a relatively small body of water is constantly submitted to the intense heat of the burner. The heated water quickly rises, displaces the relatively cold water in the upper portion of the tank, and may be drawn off for use promptly after the lighting of the burner. It is further evident that the inlet to and the outlet from the spreader are concentrically arranged in relation to each other and readily communicate with the interior of the tank through a single aperture, thus subjecting the incoming relatively cold water to the heated water as the heated water ascends from the heating chamber 23 of the spreader 13. It is also evident that the structure of the water spreader is such that the incoming relatively cold water is distributed at relatively different points with respect to the heating chamber 23. It is further evident that the construction of the water spreader permits the water to circulate freely through it and that all surfaces which might obstruct and hinder its circulation are eliminated.

Having thus described the invention, what I claim and desire to secure by Letters Patent is:

1. A thermosiphenic fluid heating unit having oppositely concaved heat transmitting walls united at their peripheries and spaced at all other points to provide a fluid heating chamber therebetween, one of said walls being formed with a tubular passageway extending transversely of said chamber and leading to a point adjacent said peripheral junction to provide an entrance passageway for fluid to said chamber, and an exit passageway leading from said chamber through said one wall.

2. A thermosiphonic fluid heating unit having an unobstructed chamber bounded by two oppositely concaved heat transmitting walls, a plurality of tubular inlet passageways radiating from a point above said chamber and communicating at their outer ends with said chamber at points adjacent the junction of said walls, and an outlet passageway for said chamber leading through the top thereof.

In witness whereof, I hereunto subscribe my name this 20th day of June A. D., 1922.

FRED W. BIRTCH.

exit passageway leading from said chamber through said one wall.

2. A thermosiphonic fluid heating unit having an unobstructed chamber bounded by two oppositely concaved heat transmitting walls, a plurality of tubular inlet passageways radiating from a point above said chamber and communicating at their outer ends with said chamber at points adjacent the junction of said walls, and an outlet passageway for said chamber leading through the top thereof.

In witness whereof, I hereunto subscribe my name this 20th day of June A. D., 1922.

FRED W. BIRTCH.

Certificate of Correction.

It is hereby certified that in Letters Patent No. 1,597,008, granted August 24, 1926, upon the application of Fred W. Birtch, of La Porte, Indiana, for an improvement in "Hot-Water Heaters," errors appear in the printed specification requiring correction as follows: Page 1, line 73, strike out the word "tubular" and insert the same before the word "water," line 75; same page, lines 95 and 96, for the misspelled word "eleminate" read *eliminate;* and that the said Letters Patent should be read with these corrections therein that the same may conform to the record of the case in the Patent Office.

Signed and sealed this 5th day of October, A. D. 1926.

[SEAL.] M. J. MOORE,
*Acting Commissioner of Patents.*

Certificate of Correction.

It is hereby certified that in Letters Patent No. 1,597,008, granted August 24, 1926, upon the application of Fred W. Birtch, of La Porte, Indiana, for an improvement in "Hot-Water Heaters," errors appear in the printed specification requiring correction as follows: Page 1, line 73, strike out the word "tubular" and insert the same before the word "water," line 75; same page, lines 95 and 96, for the misspelled word "eleminate" read *eliminate;* and that the said Letters Patent should be read with these corrections therein that the same may conform to the record of the case in the Patent Office.

Signed and sealed this 5th day of October, A. D. 1926.

[SEAL.]
M. J. MOORE,
*Acting Commissioner of Patents.*